(12) United States Patent (10) Patent No.: US 8,666,399 B2
Kholaif et al. (45) Date of Patent: Mar. 4, 2014

(54) METHODS AND APPARATUS FOR USE IN EFFICIENTLY SCANNING FOR WIRELESS NETWORKS BASED ON MOBILE DEVICE VELOCITY

(75) Inventors: Ahmed Mohammed Mohammand Kholaif, Waterloo (CA); Rudy Eugene Rawlins, Waterloo (CA)

(73) Assignee: BlackBerry Limited, Waterloo (CA)

( * ) Notice: Subject to any disclaimer, the term of this patent is extended or adjusted under 35 U.S.C. 154(b) by 257 days.

(21) Appl. No.: 13/087,752

(22) Filed: Apr. 15, 2011

(65) Prior Publication Data

US 2012/0264426 A1   Oct. 18, 2012

(51) Int. Cl.
*H04W 4/00* (2009.01)

(52) U.S. Cl.
USPC .................. 455/434; 455/435.2; 455/441

(58) Field of Classification Search
USPC .............. 455/434, 435.2, 436, 440, 441, 457
See application file for complete search history.

(56) References Cited

U.S. PATENT DOCUMENTS

| | | | |
|---|---|---|---|
| 6,556,825 B1 | 4/2003 | Mansfield | |
| 6,965,675 B1 | 11/2005 | Trimberger et al. | |
| 7,184,768 B2 | 2/2007 | Hind et al. | |
| 7,200,112 B2 | 4/2007 | Sundar et al. | |
| 7,212,827 B1 | 5/2007 | Veschl | |
| 7,221,904 B1 * | 5/2007 | Gavrilovich | 455/11.1 |
| 7,505,446 B2 | 3/2009 | Pecen | |
| 7,924,785 B2 | 4/2011 | Shaheen et al. | |
| 7,957,357 B2 | 6/2011 | Tysowski et al. | |
| 8,045,980 B2 | 10/2011 | Buckley et al. | |
| 8,055,256 B2 * | 11/2011 | Rudowicz et al. | 455/426.1 |
| 8,090,395 B2 * | 1/2012 | Ngai et al. | 455/513 |
| 8,254,985 B2 | 8/2012 | Ekicl et al. | |
| 2003/0142641 A1 | 7/2003 | Sumner et al. | |
| 2003/0228842 A1 | 12/2003 | Heinonen et al. | |

(Continued)

FOREIGN PATENT DOCUMENTS

| | | |
|---|---|---|
| EP | 1937007 A1 | 6/2008 |
| EP | 2112858 A1 | 10/2009 |

(Continued)

OTHER PUBLICATIONS

Bluetooth SIG Imaging Working Group:, "Basic Imaging Profile. Interoperability Specification", Bluetooth Documentation, Jul. 25, 2003, XP007900617, pp. 1-100, http://www.bluetooth.com/NR/rdonlyres/182ccd92-3481-44F0-B901-9181BE573AFA/924/BIP_SPEC_V10.pdf.

(Continued)

*Primary Examiner* — Temica M Beamer
(74) *Attorney, Agent, or Firm* — Perry + Currier Inc.

(57) ABSTRACT

Techniques for efficient scanning for WLANs based on mobile device velocity are described. In one illustrative example, a mobile device identifies whether its velocity is less than or greater than a threshold value. While it is identified that the velocity of the mobile device is less than the threshold value, the mobile device scans to search for one or more WLANs identified in a first subset of WLAN profiles (e.g. "stationary" WLANs). While it is identified that the velocity of the mobile device is greater than the threshold value, the mobile device scans to search for the one or more WLANs identified in a second subset of WLAN profiles (e.g. "mobile" WLANs). Advantageously, a suitable WLAN may be more efficiently identified with use of a technique which reduces power consumption of the mobile device.

20 Claims, 8 Drawing Sheets

(56) References Cited

U.S. PATENT DOCUMENTS

| | | |
|---|---|---|
| 2004/0137905 A1 | 7/2004 | Jeong et al. |
| 2004/0142693 A1 | 7/2004 | Feder et al. |
| 2004/0264427 A1 | 12/2004 | Jaakkloa et al. |
| 2005/0059397 A1 | 3/2005 | Zhao |
| 2005/0090277 A1 | 4/2005 | Islam et al. |
| 2005/0097356 A1 | 5/2005 | Zilliacus et al. |
| 2005/0148299 A1 | 7/2005 | Buckley |
| 2005/0232209 A1 | 10/2005 | Buckley et al. |
| 2005/0259619 A1 | 11/2005 | Boettle et al. |
| 2006/0217147 A1 | 9/2006 | Olvera-Hernandez et al. |
| 2006/0256008 A1 | 11/2006 | Rosenberg |
| 2007/0037574 A1 | 2/2007 | Libov et al. |
| 2007/0064650 A1 | 3/2007 | Lohtia et al. |
| 2007/0184835 A1 | 8/2007 | Bitran et al. |
| 2007/0237121 A1 | 10/2007 | Khandelwal et al. |
| 2007/0273583 A1 | 11/2007 | Rosenberg |
| 2007/0275701 A1 | 11/2007 | Jonker |
| 2008/0096580 A1 | 4/2008 | Montemurro |
| 2008/0176579 A1 | 7/2008 | Abdel-Kader |
| 2008/0182563 A1 | 7/2008 | Wugofski et al. |
| 2008/0248801 A1 | 10/2008 | Fletcher et al. |
| 2009/0011773 A1 | 1/2009 | Balachandran et al. |
| 2009/0082038 A1 | 3/2009 | McKiou et al. |
| 2009/0131081 A1 | 5/2009 | Abdel-Kader et al. |
| 2009/0175207 A1 | 7/2009 | Stephenson et al. |
| 2009/0201896 A1 | 8/2009 | Davis et al. |
| 2009/0232040 A1 | 9/2009 | Abdel-Kader |
| 2009/0279489 A1 | 11/2009 | Deu-Ngoc et al. |
| 2009/0279492 A1 | 11/2009 | Montemurro et al. |
| 2011/0014897 A1 | 1/2011 | Finucan |
| 2011/0149789 A1 | 6/2011 | Edge |
| 2011/0149806 A1 | 6/2011 | Verma et al. |
| 2011/0299422 A1 | 12/2011 | Kim et al. |
| 2011/0310875 A1 | 12/2011 | Tysowski et al. |
| 2012/0076118 A1 | 3/2012 | Montemurro et al. |

FOREIGN PATENT DOCUMENTS

| | | |
|---|---|---|
| WO | 0147316 A2 | 6/2001 |
| WO | 2007099414 A1 | 9/2007 |
| WO | 2010096063 A1 | 8/2010 |
| WO | 2012006446 A1 | 1/2012 |

OTHER PUBLICATIONS

Jooris et al., "Mobile Communication & Service Continuity in a Train Scenario", 12th Annual Symposium of the IEEE/CVT, Oct. 15, 2005, pp. 1-7, Enschede, The Netherlands.

"Digital Living Network Alliance", pp. 1-6, Jan. 13, 2011, http://en.wikipedia.org/wiki/digital living network alliance.

European Search Report for EP patent application # 11162672.7, Sep. 22, 2011.

* cited by examiner

METHODS AND APPARATUS FOR USE IN EFFICIENTLY SCANNING FOR WIRELESS NETWORKS BASED ON MOBILE DEVICE VELOCITY

BACKGROUND

1. Field of the Technology

The present disclosure relates generally to mobile communication devices which communicate in wireless communication networks, such as wireless local area networks (WLANs), and more particularly to scanning to search for and connect with such wireless networks.

2. Description of the Related Art

A mobile communication device, such as a portable battery-powered wireless communication device, is operative to communicate in wireless communication networks. For example, the mobile device may communicate through wireless access points (APs) of wireless local area networks (WLANs) which operate in accordance with IEEE 802.11 standards or the like.

When the mobile device is powered-on, or radio frequency (RF) coverage is regained after a coverage loss, the mobile device performs a scanning operation with use of its wireless transceiver to identify one or more available wireless networks in its surrounding area. During each scanning operation, the mobile device may transmit a probe request to each wireless network identified in one or more network profiles stored in the mobile device, and wait for a probe response from the network in return. Each time the scanning operation fails to result in any connection between the mobile device and a wireless network, the scanning operation is repeated by the mobile device after delaying for a delay period. This process continually repeats until the mobile device connects with one of the wireless networks.

There is a need for more efficient scanning procedures with reduced power consumption in these and similar environments.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Techniques for efficient scanning for wireless networks based on velocity are described. A mobile device identifies whether its velocity is less than or greater than a threshold value. While it is identified that the velocity of the mobile device is less than the threshold value, the mobile device scans to search for one or more wireless networks identified in a first subset of wireless network profiles (e.g. stationary wireless networks). While it is identified that the velocity of the mobile device is greater than the threshold value, the mobile device scans to search for one or more wireless networks identified in a second subset of wireless network profiles (e.g. mobile wireless networks). Advantageously, a suitable wireless network may be more efficiently identified with use of a technique which reduces power consumption of the mobile device.

Figure 1:
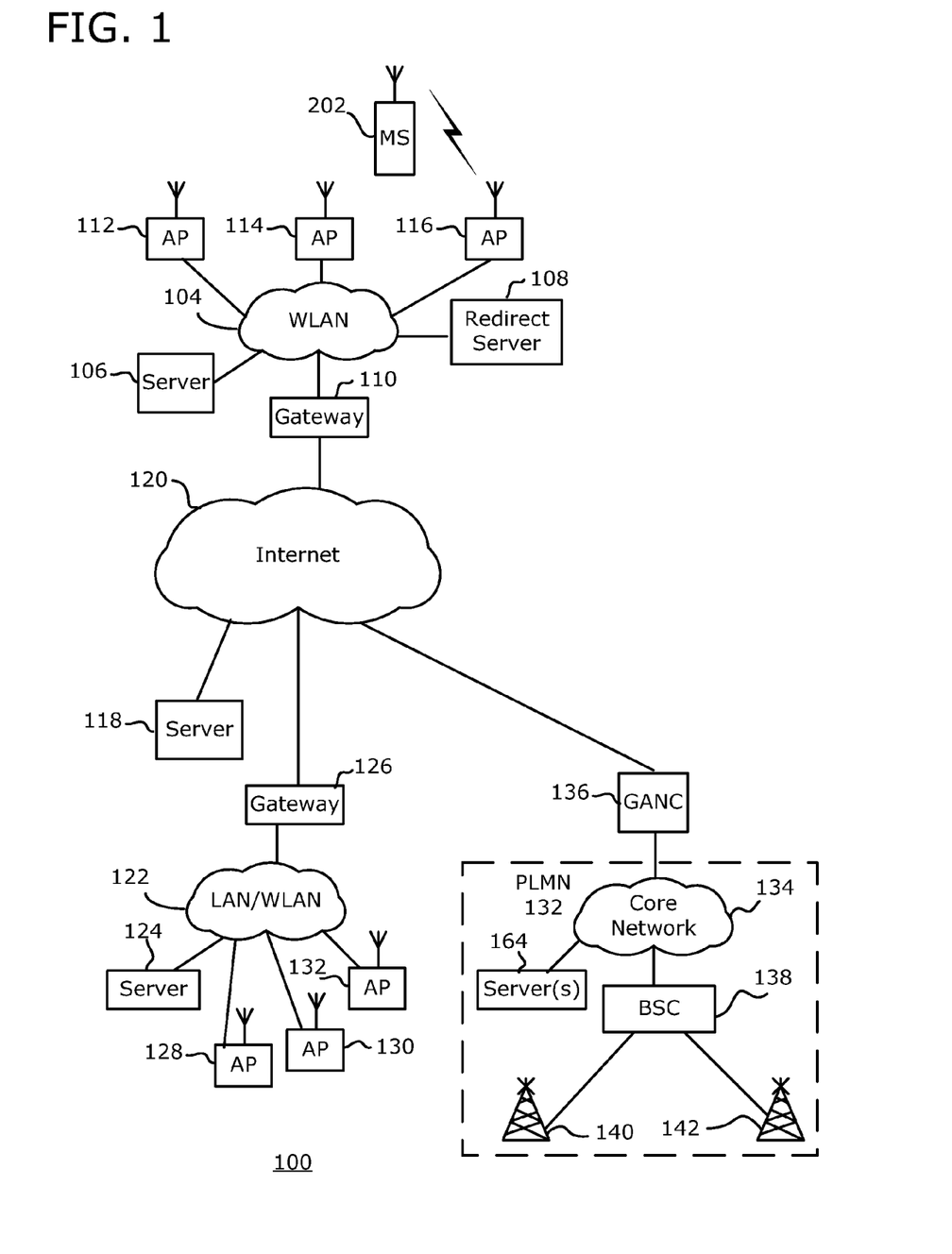
FIG. 1 is an illustrative representation of a communication system which includes wireless communication networks within which a mobile communication device may operate.

To illustrate one exemplary network architecture within which the techniques of the present disclosure may be practiced, FIG. 1 is a communication system 100 which includes a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 108 may be referred to by a different name depending on any more specific purpose (e.g. authentication server, registration server, user confirmation server, etc.).

The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Communication may also be configured in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like.

In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

Today, mobile device 202 may be further configured to enter into an access point (AP) mode of operation, so that other communication devices may associate with them for direct RF communications therebetween. This AP mode of operation, which may be referred to as a "mobile AP mode" or the like, provides a benefit due to the high data rates available over WLAN links. Here, again, the data may be communicated directly between the mobile devices without the data traversing any wireless network infrastructure, where one of the mobile devices is set to operate or serve as an access point (AP) (switching operation from as an end terminal) and the other communication device operates as an end terminal to associate and connect with the AP (i.e. the mobile device 202 operating as an AP) for communications. It is possible that when mobile device 202 operates in the AP mode, it may also operate as a client with another AP.

Figure 2:
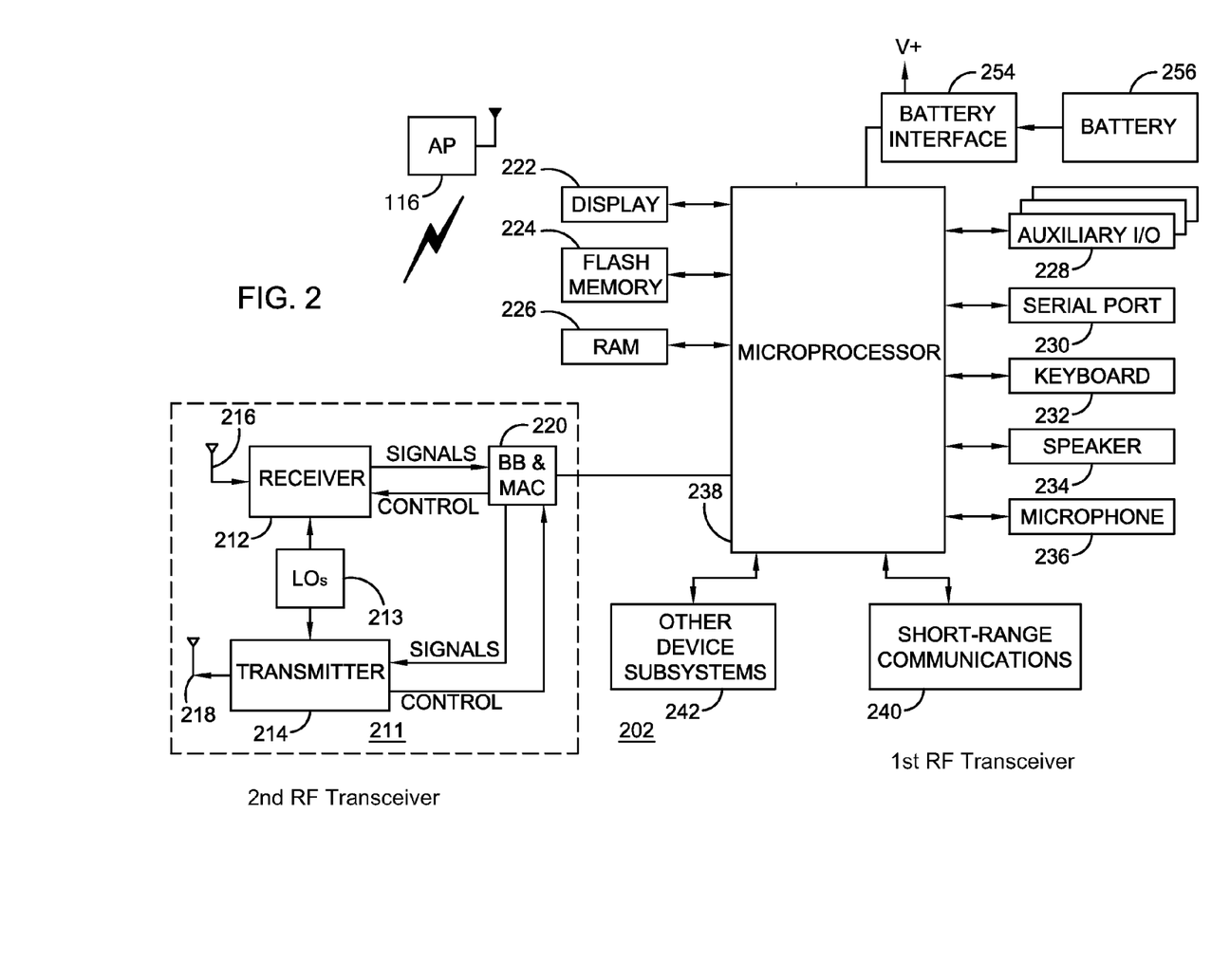
FIG. 2 is a schematic block diagram of the mobile communication device of FIG. 1.

Referring now to FIG. 2, electrical components of a typical mobile communication device 202 (e.g. a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions.

Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a nonvolatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional component that provides for communication between mobile device 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Figure 4:
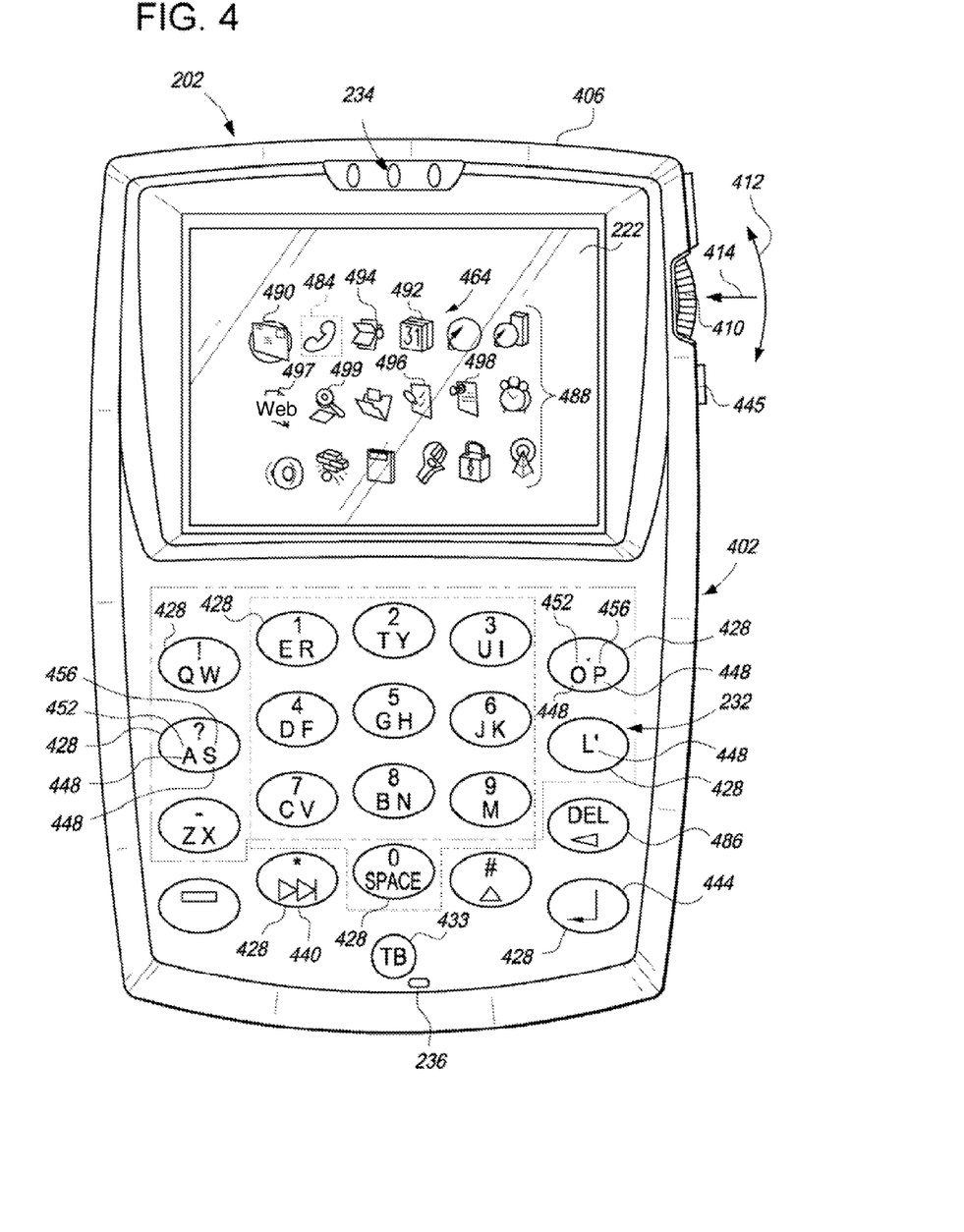
FIG. 4 is an illustrative example of an exemplary user interface of the mobile communication device.

Referring ahead to FIG. 4, an illustrative representation of an exemplary user interface 402 of mobile device 202 is shown. Mobile device 202 includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a track pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
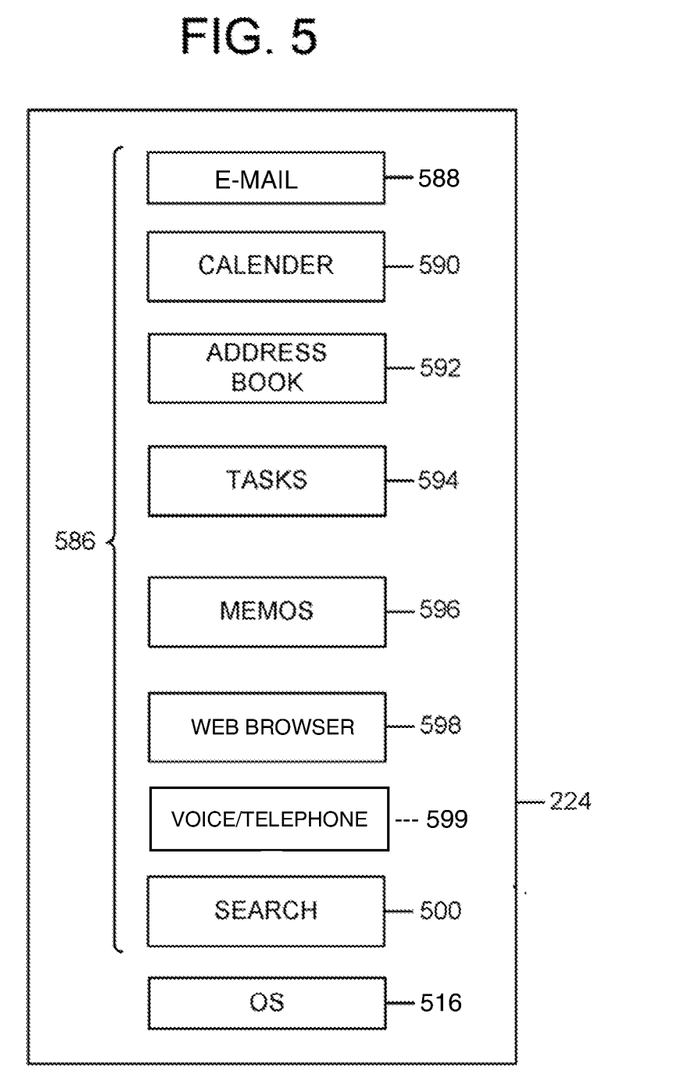
FIG. 5 is an illustrative representation of memory of the mobile communication device which includes a plurality of applications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description relates to a specific example for illustration, where the WLAN is an IEEE 802.11-based network, the techniques of the present disclosure may be applicable to different environments as well. The wireless network may be a WiMAX-based network (i.e. IEEE 802.16), or an Ultra-WideBand (UWB)-based network (i.e. IEEE 802.15), for example.

Referring back to FIG. 3A, an illustrative representation of a part of the communication system 100 of FIG. 1 which includes WLANs of a "stationary" type and WLANs of a "mobile" type is shown. More particularly, WLAN 104 and WLAN 122 are "stationary" wireless networks, and a WLAN 310 is a "mobile" wireless network.

Figure 3A:
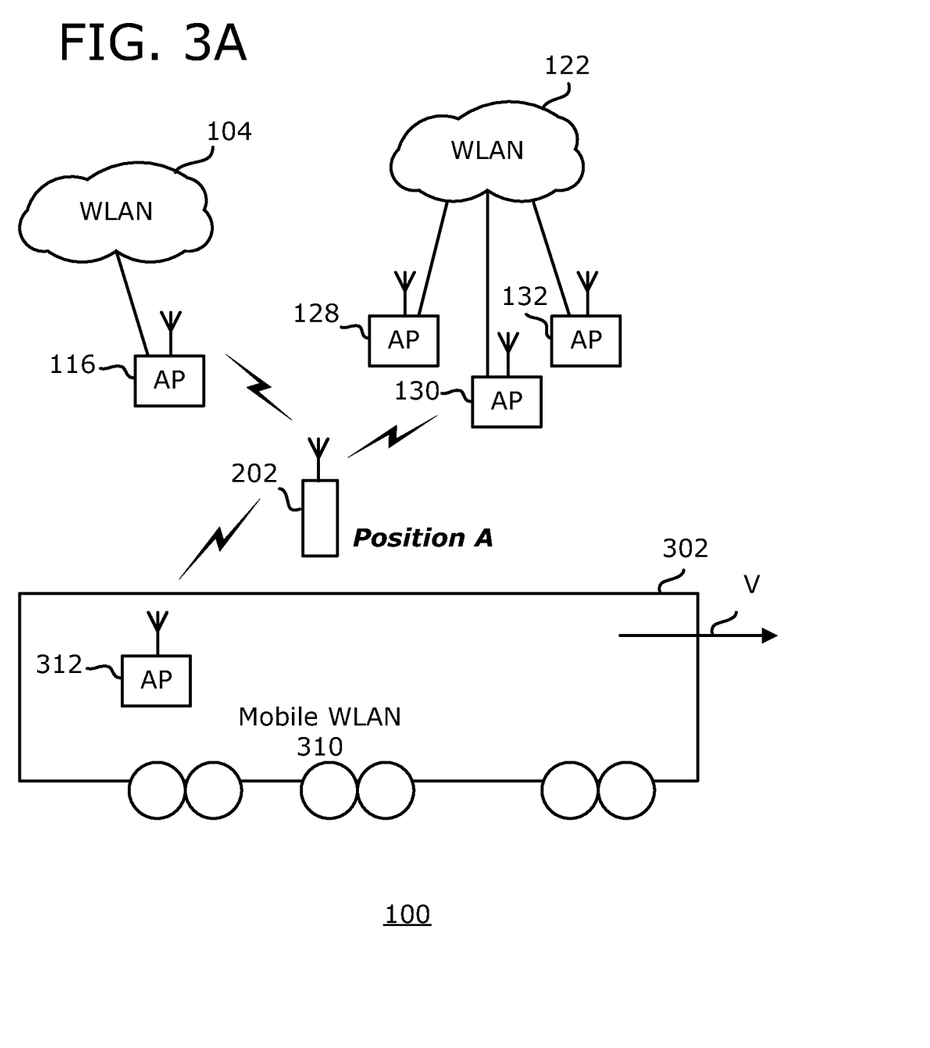
FIG. 3A is an illustration representation of a part of the communication system of FIG. 1, which includes one or more stationary wireless networks and one or more mobile wireless networks, where the mobile device is stationary or traveling at a relatively low velocity.

WLAN 310 of FIG. 3A includes at least one access point (AP) 312 and has components contained and/or carried in a vehicle 302. Vehicle 302 may be a train, a bus, a car, or the like. Vehicle 302 may travel at a velocity v; however, the velocity v may vary over time, as when vehicle 302 stops or accelerates. Being a mobile WLAN, WLAN 302 includes conventional or other suitable infrastructure components that support such mobility. Note that mobile WLANs may be designated or referred to as "location-independent" networks as well, having one or more access points which vary in geographic position or have no fixed geographic position.

Figure 3B:
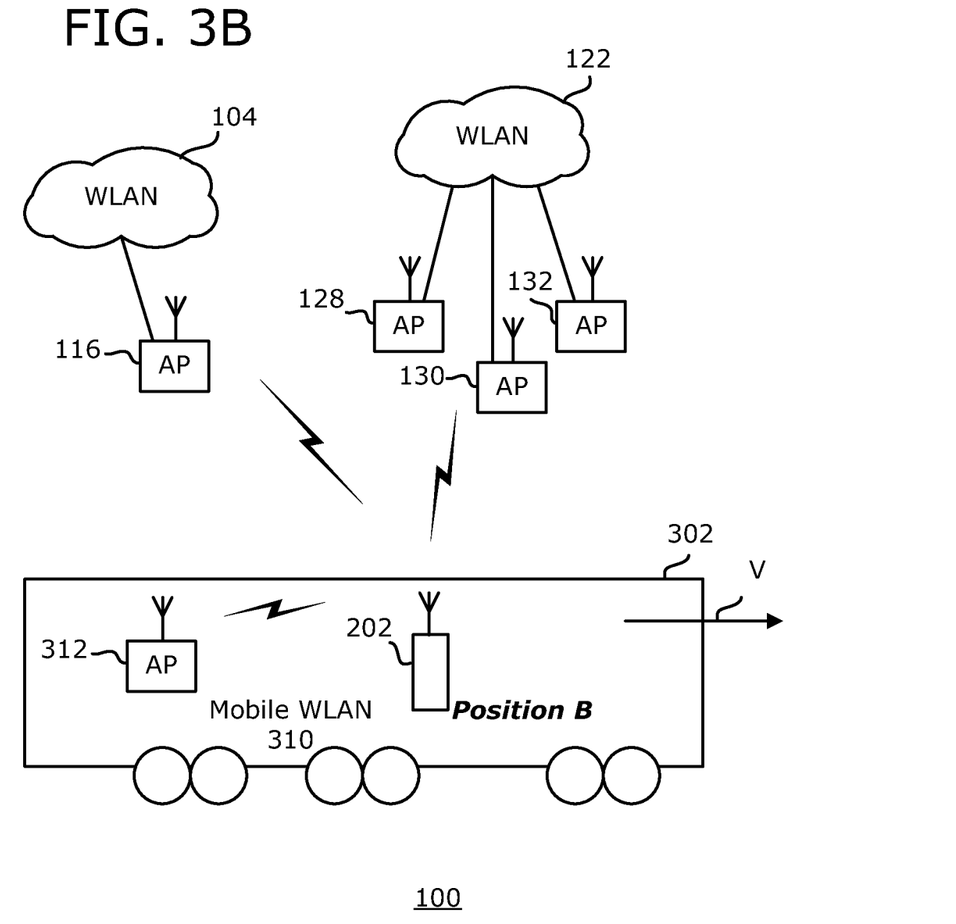
FIG. 3B is the illustration representation of the part of the communication system of FIG. 1, which includes the one or more stationary wireless networks and the one or more mobile wireless network, where the mobile device is traveling at a relatively high velocity.

In FIG. 3A, mobile device 202 is shown as not being contained in vehicle 302 (or any other vehicle). Here, the mobile device 202 may deemed to be stationary (e.g. where v=0 kilometers per hour, or km/hr) or traveling at a relatively low velocity (e.g. the user of mobile device 202 may be walking) (e.g. where 0<v<~5 km/hr). On the other hand, FIG. 3B is the same as FIG. 3A, but shows that mobile device 202 is contained and/or carried within vehicle 302, and traveling at the same relatively high velocity v of vehicle 302 (e.g. v>~5 km/hr). Here, mobile device 202 may be deemed to be moving or mobile.

According to the present disclosure, mobile device 202 is optimized to search for and communicate with stationary WLANs (e.g. stationary WLANs 104 and 112) when mobile device 202 is deemed to be stationary, and to alternatively search for and communicate with mobile WLANs (e.g. mobile WLAN 310) when mobile device 202 is deemed to be moving. In one preferred variation, mobile device 202 is optimized to search for and communicate with both stationary and mobile WLANs (e.g. stationary WLANs 104 and 112 and mobile WLAN 310) when mobile device 202 is deemed to be stationary, and to alternatively search for and communicate with mobile WLANs (e.g. mobile WLAN 310) when mobile device 202 is deemed to be moving.

Figure 6:
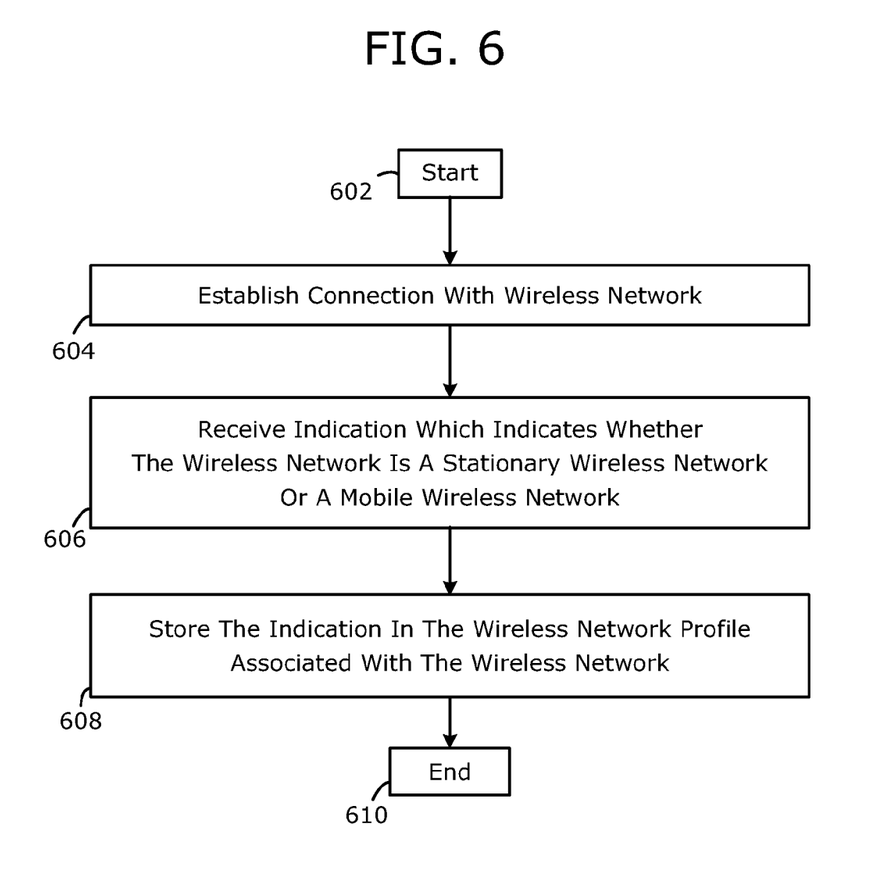
FIG. 6 is a flowchart of a method for use in scanning for wireless networks based on velocity of the mobile device.

Referring ahead now to FIG. 6, a flowchart of a method for use in scanning for wireless networks is shown. More particularly, the method of FIG. 6 relates to identifying and indicating a first subset of WLAN profiles corresponding to "stationary" WLANs (or "stationary" and "mobile" WLANs) and a second subset of WLAN profiles corresponding to "mobile" WLANs. The method of FIG. 6 may make use of the method of FIG. 7, which is described later below.

The method of FIG. 6 may be performed by mobile device 202 described in relation to FIGS. 1-5. In particular, the techniques described in relation to the flowchart may be performed by one or more controllers or processors of the mobile device along with its wireless or RF transceiver. A computer program product which may embody the technique may include a computer readable medium (e.g. memory of the communication device, computer disk, CD-ROM, etc.) having computer instructions stored therein which are executable by the one or more processors of the mobile device for performing the technique.

Note that the mobile device has one or more WLAN profiles stored in its memory, e.g. stored as a list of preferred networks. Each WLAN profile has WLAN information contained therein. The WLAN information may include an identification which identifies the WLAN (e.g. a SSID or ESSID), and any authentication information for obtaining access to the wireless network (e.g. a network key, passkey, security key, etc.). The mobile device normally operates to search for WLANs identified in its stored WLAN profiles, and communicate in an available one of these WLANs. Conversely, the mobile device normally refrains from searching for and communicating in WLANs other than those WLANs having stored WLAN profiles.

When the mobile device is powered-on, or RF coverage is regained after a coverage loss, the mobile device performs a scanning operation with use of its wireless transceiver to identify one or more available WLANs in its surrounding area. During each scanning operation, the mobile device may transmit a probe request to each WLAN identified in its WLAN profiles, and wait for a probe response from the network in return. Each time the scanning operation fails to result in any connection between the mobile device and a WLAN, the scanning operation is repeated by the mobile device after delaying for a delay period. This process continually repeats until the mobile device connects with one of the WLANs. As apparent, the lesser the number of WLANs to search for during each scanning cycle, the less power the mobile device consumes.

Beginning at a start block 602 of FIG. 6, the mobile device establishes a connection with and operates in a WLAN (step 604 of FIG. 6). If the WLAN is a newly-encountered WLAN, the mobile device may cause a user input prompt to be displayed in the display, where the user input prompt indicates a request for whether a WLAN profile associated with the WLAN should be saved in memory. In response, the mobile device stores a WLAN profile associated with the WLAN in memory, e.g. in its list of preferred networks. For such usable WLANs, the mobile device receives an indication which indicates whether the WLAN is of the stationary type or the mobile type (step 606 of FIG. 6). In response, the mobile device stores, in the WLAN profile associated with the WLAN, a corresponding indication of whether the WLAN is of the stationary type or the mobile type (step 608 of FIG. 6). The flowchart of FIG. 6 ends at an end block 610.

Thus, some WLAN profiles stored in memory correspond to WLANs indicated or designated as "stationary" WLANs, whereas other WLAN profiles stored in memory correspond to WLANs indicated or designated as "mobile" WLANs. As described, the mobile device maintains in each WLAN profile a "stationary wireless network" indication for a stationary wireless network, or a "mobile wireless network" indication for a mobile wireless network. Note again that mobile wireless networks may be designated or referred to as "location-independent" networks, having one or more access points which vary in or have no geographic position. The mobile device may utilize the described indications to select or sort the WLAN profiles for efficient scanning, as described further below in relation to FIG. 7.

In step 606, the mobile device may receive from the WLAN a message which indicates whether the WLAN is of the stationary type or the mobile type. The indication may be a data indication or a bit indication in the message (e.g. a bit indication of "0" indicating a stationary type or a bit indication of "1" indicating a mobile type). The indication may be an indication in a data field which is reserved for the sole purpose of communicating the type of WLAN (i.e. stationary or mobile type). More particularly, the indication may be defined as a new, unique information element (IE) defined in IEEE 802.11 or other relevant standard. The WLAN may regularly or periodically broadcast one or more indicators that are indicative of the type, which are received by the mobile device. Alternatively, the mobile device may transmit a probe request to the WLAN and, in response, receive a probe response which includes the one or more indicators of the type. In such embodiments, the mobile device need not have to connect with the WLAN as described in relation to step 604 of FIG. 6 in order to receive such indication.

Alternatively, the indication may be an indication in a data field which is utilized for a different purpose but nonetheless determinable of the type (e.g. through examination or inference). For example, the mobile device may determine whether the WLAN is stationary or mobile based on the WLAN identification associated therewith. To illustrate, the mobile device may maintain in memory a stored list of WLAN identifications of the mobile type, and compare the WLAN identification with those in the stored list of WLAN identifications. If there is a match between the WLAN identification and any one of the identifications in the stored list, then the mobile device may deem that the WLAN is of the mobile type. This stored list of WLAN identifications may be stored in advance of device operation, and/or received via its receiver or wireless receiver. Here, the mobile device may receive the list of WLAN identifications on a regional or country basis based on the current location of the mobile device. In one variation of this approach, the mobile device may maintain in memory a stored list of names indicative of the mobile type (e.g. the name "AMTRAK", "GREYHOUND", or any other transportation-indicative name), and compare at least portions of the WLAN identification with the names in the stored list of names. If there is a match between a portion of the WLAN identification and any one of the names in the stored list, then the mobile device may deem that the WLAN is of the mobile type.

Figure 7:
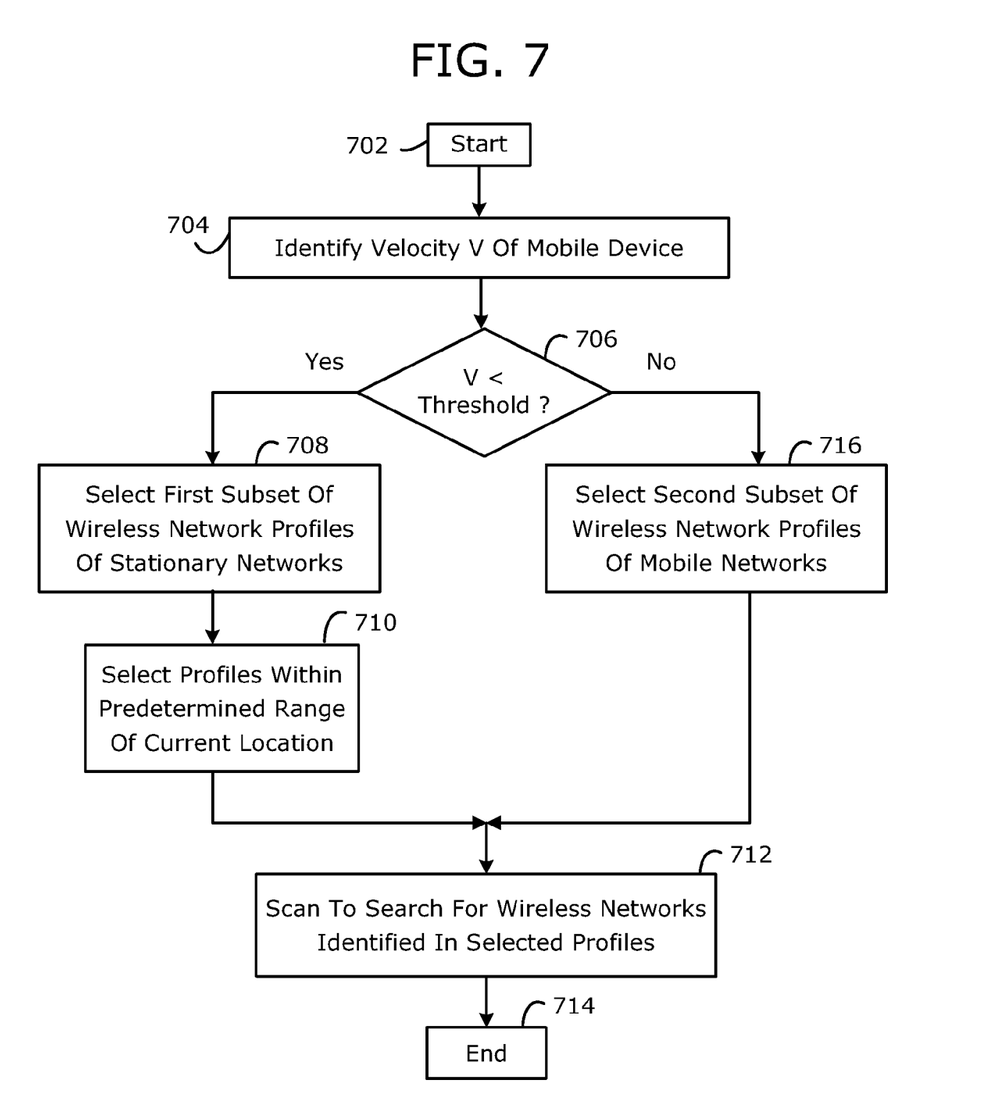
FIG. 7 is a flowchart of a further method for use in scanning for wireless networks based on velocity of the mobile device.

FIG. 7 is another flowchart of a method for use in scanning for wireless networks is shown. The method of FIG. 7 may make use of the method of FIG. 6, described above. More particularly, the method of FIG. 7 relates to scanning a first subset of WLAN profiles (e.g. WLAN profiles corresponding to "stationary" WLANs, or both "stationary" and "mobile" WLANs) when the mobile device is stationary, and scanning a second subset of WLAN profiles (e.g. WLAN profiles corresponding to "mobile" WLANs) when the mobile device is moving at a relatively high velocity. Similar to FIG. 6, the method of FIG. 7 may be performed by mobile device 202 described in relation to FIGS. 1-5. In particular, the techniques described in relation to the flowchart may be performed by one or more controllers or processors of the mobile device along with its wireless or RF transceiver. A computer program product which may embody the technique may include a computer readable medium (e.g. memory of the communication device, computer disk, CD-ROM, etc.) having computer instructions stored therein which are executable by the one or more processors of the mobile device for performing the technique.

Operation commences in FIG. 7 with the mobile device having no established connections with any WLAN. Beginning at a start block 702 of FIG. 7, the mobile device identifies its current velocity v (step 704 of FIG. 7). If the mobile device is not contained within any moving vehicle (see e.g. FIG. 3A), the mobile device is deemed to be stationary (e.g. v=0 km/hr) or traveling at a relatively low velocity (e.g. 0<v<~5 km/hr). If the mobile device is contained within a moving vehicle traveling at a velocity v (see e.g. FIG. 3B), the mobile device will be traveling at the same velocity v as the vehicle (e.g. v>~5 km/hr).

The velocity of the mobile device may be received and obtained in step 704 any number of suitable ways. For example, if the mobile device is equipped with a GPS receiver, the mobile device may use the GPS receiver to periodically receive its location L. Based on a current location $L_C$ and a previous location $L_P$ of the mobile device, the mobile device may determine a distance traveled D (e.g. $D=L_C-L_P$). Based on the distance D and the time between location samples, the mobile device may determine its measurement of velocity v. Here, the velocity v may be based on the expression $v=D/\Delta T_S$, where $\Delta T_S$ is the time between samples of the location. Alternatively, the mobile device may utilize a location determination mechanism (which includes a GPS component or the like) which is accessible via a wireless network. In this case, the mobile device periodically receives its location from the wireless network to determine its measurement of velocity v in the same or similar manner.

In another embodiment of step 704, during operation the mobile device may regularly or continually operate a different RF transceiver (e.g. a cellular transceiver) for communications a different wireless network (e.g. a cellular network or PLMN 132 of FIG. 1). Here, the processor may count the number of different cells selected by the mobile device in the cellular network over a fixed period of time. The processor stores and maintains this count in memory. In such embodiment, the measurement of velocity of the mobile device is based on the count of the number of different cells selected by the mobile device. For example, the larger the count of the number of different cells selected for communications over the fixed period of time, the larger the measurement of velocity of the mobile device. In addition or alternatively, the processor may count of the number of times the same cell has been reselected by the mobile device in the cellular network. The larger the count of the number of times the same cell has been reselected for communications over the fixed period of time, the smaller the measurement of velocity of the mobile device. Additional details of such operation are described in U.S. Pat. No. 7,505,446 B2, which is hereby incorporated by reference herein. In other embodiments, other suitable techniques for obtaining or estimating mobile device velocity may be utilized.

The mobile device then identifies whether its current velocity v is less than or greater than a threshold value (step 706 of FIG. 7). If the velocity is identified to be less than the threshold value at step 706, then the mobile device may be deemed to be stationary or have relatively low velocity. In this case, the mobile device selects a first subset of WLAN profiles from those stored in memory (step 708 of FIG. 7). The first subset of WLAN profiles may correspond to "stationary" WLANs, and be selected by identifying those WLAN profiles having "stationary type" indications stored therein. Alternatively, the first subset of WLAN profiles may correspond to both "stationary" and "mobile" WLANs, and be selected by identifying those WLAN profiles having either type of indication.

The mobile device may further select, from the first subset of WLAN profiles, only those stationary WLAN profiles corresponding to stationary WLANs that are within a predetermined range of the current location of the mobile device (step 710 of FIG. 7). The process of step 710 will be described in more detail later below. Note that, where the first subset of WLAN profiles includes mobile WLAN profiles corresponding to mobile WLANs, all of the mobile WLAN profiles will be selected for scanning, as mobile WLANs are not associated with a particular location.

Alternatively, at step 706, if the velocity of the mobile device is identified to be greater than the threshold value, then the mobile device may be deemed to be moving or have a relatively high velocity. In this case, the mobile device selects a second subset of WLAN profiles from those stored in memory (step 716 of FIG. 7). The second subset of WLAN profiles may correspond to "mobile" WLANs, and be selected by identifying those WLAN profiles having the "mobile type" indications stored.

The mobile device operates to scan to search for those WLANs identified in the selected WLAN profiles (step 712 of FIG. 7). On the other hand, the mobile device refrains from scanning to search for WLANs in other, non-selected WLAN profiles. During each scanning cycle, the mobile device may send a probe request to each WLAN identified in the selected WLAN profiles, and wait to receive a probe response from the network (if available) in return. This may be done with use of the WLAN identification (e.g. SSID) stored in association with each WLAN profile. Each time the scanning operation fails to result in any connection between the mobile device and a WLAN, the scanning operation is repeated by the mobile device after delaying for a delay period.

In one embodiment, the mobile device is configured to employ hysteresis in the technique of FIG. 7, with use of a timer or counter. Hysteresis is employed so that "false triggering" of WLAN profile selection in response to sudden, abrupt changes in velocity is avoided. For example, a timer or counter may be utilized in steps 704 and/or 706 of FIG. 7 to ensure that a steady velocity reading is utilized before a different WLAN profile subset is selected.

This process continually repeats until the mobile device connects with one of the WLANs. When connected and operating in the WLAN, the mobile device receives services made available in or via the WLAN. The services may be or include a voice telephony service (e.g. VoIP) and/or a data communication service (e.g. Web browsing service, data synchronization service, e-mail message delivery service, etc., facilitated via a packet data communication service). The flowchart ends at an end block 714 of FIG. 7.

As apparent, as the mobile device may have a lower number of WLANs to search for in each scanning cycle (i.e. the first or the second subset of WLAN profiles, in contrast to WLAN profiles in both subsets), the more quickly and efficiently the mobile device can identify and connect with a suitable WLAN for communications. Further, the mobile device may connect with WLANs which are most suitable for long term connection (e.g. when stationary, the mobile device may refrain from attempting to scan for mobile WLANs which are known to be transient). Finally, the mobile device will consume less power as the number of WLANs to search for is lower. For example, if the mobile device has ten (10) WLAN profiles stored therein, five (5) of which are designated as stationary WLANs (i.e. the first subset) and five (5) of which are designated as mobile WLANs (i.e. the second subset), the mobile device only scans to search for half as many WLANs during each scanning cycle.

As described in relation to step 710 of FIG. 7, the mobile device may further select, from the first subset of WLAN profiles, only those stationary WLAN profiles corresponding to stationary WLANs that are within a predetermined range of the device's current location. This may be done as follows. Each stationary WLAN profile in the first subset of WLAN profiles may include position information corresponding to a geographic position of the WLAN associated therewith. When selecting the stationary WLAN profiles from the first subset for scanning (i.e. in step 710 of FIG. 7), the mobile device identifies position information corresponding to a current geographic position of the mobile device. This may done with use of the GPS receiver, where the mobile device may use the GPS receiver to periodically receive its geographic position or location. On the other hand, the mobile device may associate various geographic positions with one or more different cell identifiers of one or more cellular networks being identified. In other embodiments, other suitable techniques for obtaining or estimating mobile device location may be utilized.

Each stationary WLAN profile has position information corresponding to one or more locations of the one or more WLANs associated with the same network identifier or SSID. The comparison is performed for identifying whether the mobile device is within a predetermined range of any of the WLANs. If the mobile device is within the predetermined range of the WLAN, then the mobile device will select the WLAN profile for scanning to search for the WLAN. Otherwise, if the mobile device is outside of the predetermined range of the WLAN, then the mobile device will not select the WLAN profile for scanning, and therefore refrain from scanning to search for the stationary WLAN associated with that WLAN profile.

Thus, techniques for efficient scanning for wireless networks based on mobile device velocity are described. A mobile device identifies whether its velocity is less than or greater than a threshold value. While it is identified that the velocity of the mobile device is less than the threshold value, the mobile device scans to search for one or more wireless networks identified in a first subset of wireless network profiles (e.g. stationary wireless networks, or stationary and mobile wireless networks). While it is identified that the velocity of the mobile device is greater than the threshold value, the mobile device scans to search for one or more wireless networks identified in a second subset of wireless network profiles (e.g. the mobile wireless networks). Advantageously, a suitable wireless network may be more efficiently identified with use of a technique which reduces power consumption of the mobile device.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless network may be a Bluetooth-based network, a WiMAX-based network (i.e. IEEE 802.16), or an Ultra-WideBand (UWB)-based network (i.e. IEEE 802.15). Also, although specific techniques for identifying or estimating location and velocity have been described, in some embodiments any suitable technique for identifying or estimating location and/or velocity may be utilized. The invention described herein in the recited claims intends to cover and embrace all suitable changes in technology.

What is claimed is:

1. A method for use in scanning for wireless networks by a mobile communication device which has a set of wireless network profiles stored therein, the method comprising the acts of:
    identifying whether a velocity of the mobile device is less than or greater than a threshold value;
    while the velocity of the mobile device is less than the threshold value: scanning to search for one or more wireless networks identified in a first subset of wireless network profiles stored in the mobile device; and
    while the velocity of the mobile device is greater than the threshold value: scanning to search for one or more wireless networks identified in a second subset of wireless network profiles stored in the mobile device;
    wherein the one or more wireless networks identified in the first subset of wireless network profiles are stationary wireless networks, and wherein the one or more wireless networks identified in the second subset of wireless network profiles are mobile wireless networks.

2. The method of claim 1, wherein the one or more wireless networks identified in the first subset of wireless network profiles are stationary wireless networks and mobile wireless networks, and wherein the one or more wireless networks identified in the second subset of wireless network profiles are the mobile wireless networks.

3. The method of claim 1, further comprising:
    maintaining a mobile wireless network indication in each one of the wireless network profiles corresponding to the wireless networks identified in the second subset of wireless network profiles.

4. The method of claim 1, further comprising:
    for each one of the wireless networks:
        communicating in the wireless network;
        identifying, during the communicating, whether the wireless network is a stationary wireless network or a mobile wireless network; and
        if the wireless network is identified to be a mobile wireless network, then storing a mobile wireless network indication in the wireless network profile corresponding to the wireless network.

5. The method of claim 1, further comprising:
    for each one of a plurality of the wireless networks:
        communicating in the wireless network;
        receiving, from the wireless network, an indication that the wireless network is a mobile wireless network; and
        storing a mobile wireless network indication in the wireless network profile corresponding to the wireless network.

6. The method of claim 1, wherein each one of a plurality of the wireless network profiles in the first subset includes position information corresponding to a geographic position of the stationary wireless network associated therewith, and wherein the scanning to search for the one or more stationary wireless networks identified in the first subset of wireless network profiles further comprises:
    identifying position information corresponding to a geographic position of the mobile device;
    for each wireless network profile in the first subset:
        comparing the position information of the mobile device with the position information of the wireless network for identifying whether the mobile device is within a predetermined range of the wireless network; and
        if the mobile device is within the predetermined range of the wireless network, then scanning to search for the stationary wireless network; and
        if the mobile device is outside of the predetermined range of the wireless network, then refraining from scanning to search for the stationary wireless network.

7. The method of claim 1, wherein the mobile device is operative for communications with wireless networks comprising wireless local area networks (WLANs) operative in accordance with IEEE 802.11.

8. The method of claim 1, comprising the further acts of:
    receiving signals via a global position system (GPS) receiver of the mobile device; and
    obtaining the velocity based on the signals received via the GPS receiver.

9. The method of claim 1, further comprising:
    obtaining the velocity based on a count of the number of cells of a cellular telecommunication network that have been selected or reselected for communication by the mobile device over a time period of operation.

10. The method of claim 1, which is performed by computer instructions stored in a non-transitory computer readable medium, the computer instructions being executable on one or more processors of the mobile device.

11. A mobile communication device, comprising:
a controller;
a radio frequency (RF) transceiver coupled to the controller;
the RF transceiver configured to communicate over a communication channel of a wireless communication network;
a memory coupled to the controller;
the memory having a set of wireless network profiles stored therein;
the controller being configured to:
identify whether a velocity of the mobile device is less than or greater than a threshold value;
while it is identified that the velocity of the mobile device is less than the threshold value: scan, with the RF transceiver, to search for one or more wireless networks identified in a first subset of wireless network profiles stored in the mobile device; and
while it is identified that the velocity of the mobile device is greater than the threshold value: scan, with the RF transceiver, to search for one or more wireless networks identified in a second subset of wireless network profiles stored in the mobile device;
wherein the one or more wireless networks identified in the first subset of wireless network profiles are stationary wireless networks, and wherein the one or more wireless networks identified in the second subset of wireless network profiles comprise mobile wireless networks.

12. The mobile device of claim 11, wherein each one of the wireless network profiles corresponding to the wireless networks identified in the second subset including a mobile wireless network indication stored therein.

13. The mobile device of claim 11, wherein the controller is further configured to:
communicate with the wireless network;
identify, during the communicating, whether the wireless network is a stationary wireless network or a mobile wireless network; and
if the wireless network is identified to be a mobile wireless network, then store a mobile wireless network indication in the wireless network profile corresponding to the wireless network.

14. The mobile device of claim 11, wherein the controller is further configured to:
for each one of a plurality of the wireless networks:
communicate with the wireless network;
receive, from the wireless network, an indication that the wireless network is a mobile wireless network; and
store a mobile wireless network indication in the wireless network profile corresponding to the wireless network.

15. The mobile device of claim 11, wherein each one of a plurality of the wireless network profiles in the first subset includes position information corresponding to a geographic position of the stationary wireless network associated therewith, and wherein the controller is further configured to scan to search for the one or more stationary wireless networks identified in the first subset of wireless network profiles by:
identifying position information corresponding to a geographic position of the mobile device;
for each wireless network profile in the first subset:
comparing the position information of the mobile device with the position information of the wireless network for identifying whether the mobile device is within a predetermined range of the wireless network; and
if the mobile communication device is within the predetermined range of the wireless network, then scanning to search for the stationary wireless network; and
if the mobile device is outside of the predetermined range of the wireless network, then refraining from scanning to search for the stationary wireless network.

16. The mobile device of claim 11, which is operative for communications with wireless networks comprising wireless local area networks (WLANs).

17. The mobile device of claim 11, wherein the controller is further configured to:
receive signals via a global position system (GPS) receiver of the mobile device; and
obtain the velocity based on the signals received via the GPS receiver.

18. The mobile device of claim 11, wherein the controller is further configured to:
obtain the velocity based on a count of the number of cells of a cellular telecommunication network that have been selected or reselected for communication by the mobile device over a time period of operation.

19. The mobile device of claim 11, wherein the controller is further configured to:
while it is identified that the velocity of the mobile device is less than the threshold value: refrain from scanning to search for one or more wireless networks identified in the second subset of wireless network profiles; and
while it is identified that the velocity of the mobile device is greater than the threshold value refrain from scanning to search for one or more wireless networks identified in the first subset of wireless network profiles.

20. The mobile device of claim 15, wherein the controller is further configured to obtain the position information by receiving signals via a global position system (GPS) receiver of the mobile device or by receiving one or more cell identifiers for one or more cells within which the mobile device operates.

* * * * *